United States Patent
Stern et al.

(10) Patent No.: US 11,493,831 B2
(45) Date of Patent: Nov. 8, 2022

(54) BREATHABLE MEMBRANE FOR LENS ASSEMBLY HAVING A SECOND LENS BARREL POSITIONED WITHIN AND REMOVEABLE FROM A FIRST LENS BARREL

(71) Applicant: GoPro, Inc., San Mateo, CA (US)

(72) Inventors: Jonathan Stern, San Mateo, CA (US); Matthew Feddersen, San Francisco, CA (US); Michael Brookmire, Half Moon Bay, CA (US); Joseph Tucker, Foster City, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/023,202

(22) Filed: Sep. 16, 2020

(65) Prior Publication Data

US 2021/0080809 A1    Mar. 18, 2021

Related U.S. Application Data

(60) Provisional application No. 62/901,877, filed on Sep. 18, 2019.

(51) Int. Cl.
*H04N 5/225* (2006.01)
*G03B 17/08* (2021.01)
*G02B 1/18* (2015.01)
*G03B 17/12* (2021.01)

(52) U.S. Cl.
CPC .............. *G03B 17/08* (2013.01); *G02B 1/18* (2015.01); *G03B 17/12* (2013.01); *H04N 5/2254* (2013.01)

(58) Field of Classification Search
CPC ........................... G03B 17/08; H04N 5/22521
See application file for complete search history.

(56) References Cited

U.S. PATENT DOCUMENTS

| | | | |
|---|---|---|---|
| 9,167,140 B2* | 10/2015 | Nakajima | H04N 5/2257 |
| 9,609,195 B2* | 3/2017 | Czepowicz | G03B 17/12 |
| 10,440,248 B2* | 10/2019 | Park | G03B 17/08 |
| 2007/0206109 A1* | 9/2007 | Tu | H04N 5/2254 |
| | | | 348/340 |
| 2008/0237768 A1* | 10/2008 | Yajima | H04N 5/2257 |
| | | | 257/434 |
| 2011/0242321 A1* | 10/2011 | Nakajima | G02B 7/021 |
| | | | 348/148 |

(Continued)

FOREIGN PATENT DOCUMENTS

| | | | | |
|---|---|---|---|---|
| JP | 2007128987 A | * | 5/2007 | |
| JP | 2009100174 A | * | 5/2009 | |
| WO | WO-2008093463 A1 | * | 8/2008 | ......... H01L 31/0232 |

*Primary Examiner* — Gary C Vieaux
(74) *Attorney, Agent, or Firm* — Young Basile Hanlon & MacFarlane, P.C.

(57) ABSTRACT

Breathable membranes for lens assemblies are described. For example, a system may include a lens barrel having an inner channel extending from a first end of the lens barrel to a second end of the lens barrel. The lens barrel can include one or more inner lenses positioned within the inner channel. The lens barrel has a vent hole in a side of the lens barrel that extends from the inner channel to an exterior surface of the lens barrel. The system includes a membrane attached to the lens barrel and positioned to cover the vent hole. The membrane has pores large enough to permit nitrogen gas to flow through the membrane and the vent hole.

20 Claims, 8 Drawing Sheets

(56) References Cited

U.S. PATENT DOCUMENTS

| | | | |
|---|---|---|---|
| 2012/0019940 A1* | 1/2012 | Lu | G02B 7/02 |
| | | | 359/819 |
| 2012/0039596 A1* | 2/2012 | Hou | G03B 17/12 |
| | | | 396/535 |
| 2012/0062790 A1* | 3/2012 | Tazoe | G02B 27/0006 |
| | | | 348/374 |
| 2012/0133825 A1* | 5/2012 | Nakajima | H04N 5/2254 |
| | | | 348/374 |
| 2012/0229701 A1* | 9/2012 | Pavithran | H04N 5/2252 |
| | | | 348/374 |
| 2015/0321556 A1* | 11/2015 | Chamuczynski | G02B 27/0006 |
| | | | 359/512 |
| 2016/0212308 A1* | 7/2016 | Ahn | H04N 5/2252 |
| 2017/0280558 A1* | 9/2017 | Ohara | G03B 17/55 |
| 2018/0039162 A1* | 2/2018 | Ali | H04N 5/2252 |
| 2019/0137724 A1* | 5/2019 | Kim | H04N 5/2254 |
| 2020/0049951 A1* | 2/2020 | Wei | G02B 13/0015 |
| 2020/0133095 A1* | 4/2020 | Cotoros | H04N 5/2258 |

* cited by examiner

BREATHABLE MEMBRANE FOR LENS ASSEMBLY HAVING A SECOND LENS BARREL POSITIONED WITHIN AND REMOVEABLE FROM A FIRST LENS BARREL

CROSS-REFERENCE TO RELATED APPLICATION

This application claims priority to and the benefit of U.S. Provisional Patent Application No. 62/901,877, filed Sep. 18, 2019, the entire disclosure of which is hereby incorporated by reference.

TECHNICAL FIELD

This disclosure relates to breathable membranes for lens assemblies.

BACKGROUND

Image capture devices, such as cameras, may capture content as images (e.g., still images or frames of video). Light may be received and focused via a lens and may be converted to an electronic image signal by an image sensor. The image signal may be processed by an image signal processor (ISP) to form an image, which may be stored and/or encoded. In some implementations, multiple images or video frames may include spatially adjacent or overlapping content. An outer lens may be subject to scratching, cracks, or other damage from impacts during use of an image capture device, which may cause optical distortion and degradation of quality of captured images. For example, lenses supporting a wide field-of-view (e.g., a fisheye les) may protrude from the body of an image capture device, and thus be particularly vulnerable to impact damage.

SUMMARY

Disclosed herein are implementations of breathable membranes for lens assemblies.

In a first aspect, the subject matter described in this specification can be embodied in apparatuses that include a lens barrel having an inner channel extending from a first end of the lens barrel to a second end of the lens barrel, the lens barrel including one or more inner lenses positioned within the inner channel, wherein the lens barrel has a vent hole in a side of the lens barrel that extends from the inner channel to an exterior surface of the lens barrel; and a membrane attached to the lens barrel and positioned to cover the vent hole, wherein the membrane has pores large enough to permit nitrogen gas to flow through the membrane and the vent hole.

In the first aspect, the apparatuses may include an outer lens that is attached to the lens barrel and positioned to cover the first end of the lens barrel. In the first aspect, the outer lens is attached to the lens barrel with an air-tight seal. In the first aspect, the apparatuses may include a circuit board positioned to cover the second end of the lens barrel, and an image sensor attached to the circuit board and positioned at the second end of the lens barrel to receive light incident through the one or more inner lenses of the lens barrel. For example, the lens barrel may be glued to the circuit board. In the first aspect, the membrane may be hydrophobic. In the first aspect, the membrane may include polytetrafluoroethylene. In the first aspect, the membrane may be waterproof In the first aspect, the membrane may include pores of widths in a range between 5 micrometers and 60 micrometers. The first aspect may include any combination of the features described in this paragraph.

In a second aspect, the subject matter described in this specification can be embodied in apparatuses that include a lens barrel having an inner channel extending from a first end of the lens barrel to a second end of the lens barrel, the lens barrel including one or more inner lenses positioned within the inner channel; a circuit board attached to the lens barrel and positioned to cover the second end of the lens barrel, wherein the circuit board has a vent hole that extends from the inner channel to an opposite side of the circuit board; and a membrane attached to the circuit board and positioned to cover the vent hole, wherein the membrane has pores large enough to permit nitrogen gas to flow through the membrane and the vent hole.

In the second aspect, the apparatuses may include an outer lens that is attached to the lens barrel and positioned to cover the first end of the lens barrel. For example, the outer lens may be attached to the lens barrel with an air-tight seal. In the second aspect, the apparatuses may include an image sensor attached to the circuit board and positioned at the second end of the lens barrel to receive light incident through the one or more inner lenses of the lens barrel. In the second aspect, the lens barrel may be glued to the circuit board. In the second aspect, the membrane may be hydrophobic. In the second aspect, the membrane may include polytetrafluoroethylene. In the second aspect, the membrane may be waterproof In the second aspect, the membrane may include pores of widths in a range between 5 micrometers and 60 micrometers. The second aspect may include any combination of the features described in this paragraph.

In a third aspect, the subject matter described in this specification can be embodied in image capture devices that include a lens assembly including a cavity between an outer lens and an image sensor attached to a circuit board, with one or more inner lenses positioned inside the cavity to direct light incident on the outer lens to the image sensor, wherein the cavity is connected to a space external to the lens assembly by a vent hole; and a membrane positioned to cover the vent hole, wherein the membrane has pores large enough to permit nitrogen gas to flow through the membrane and the vent hole.

In the third aspect, the space external to the lens assembly may be internal to a body of the image capture device that is attached to the lens assembly. In the third aspect, the space external to the lens assembly may be external to a body of the image capture device that is attached to the lens assembly. In the third aspect, the membrane may be hydrophobic. In the third aspect, the membrane may include polytetrafluoroethylene. In the third aspect, the membrane may be waterproof In the third aspect, the membrane may include pores of widths in a range between 5 micrometers and 60 micrometers. In the third aspect, the vent hole may be in the circuit board and extends from the cavity to an opposite side of the circuit board. In the third aspect, the lens assembly may include a lens barrel having an inner channel, which bounds the cavity, extending from a first end of the lens barrel to a second end of the lens barrel. The one or more inner lenses may be positioned within the inner channel. In the third aspect, the vent hole may be in a side of the lens barrel and extends from the inner channel to an exterior surface of the lens barrel. The third aspect may include any combination of the features described in this paragraph.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
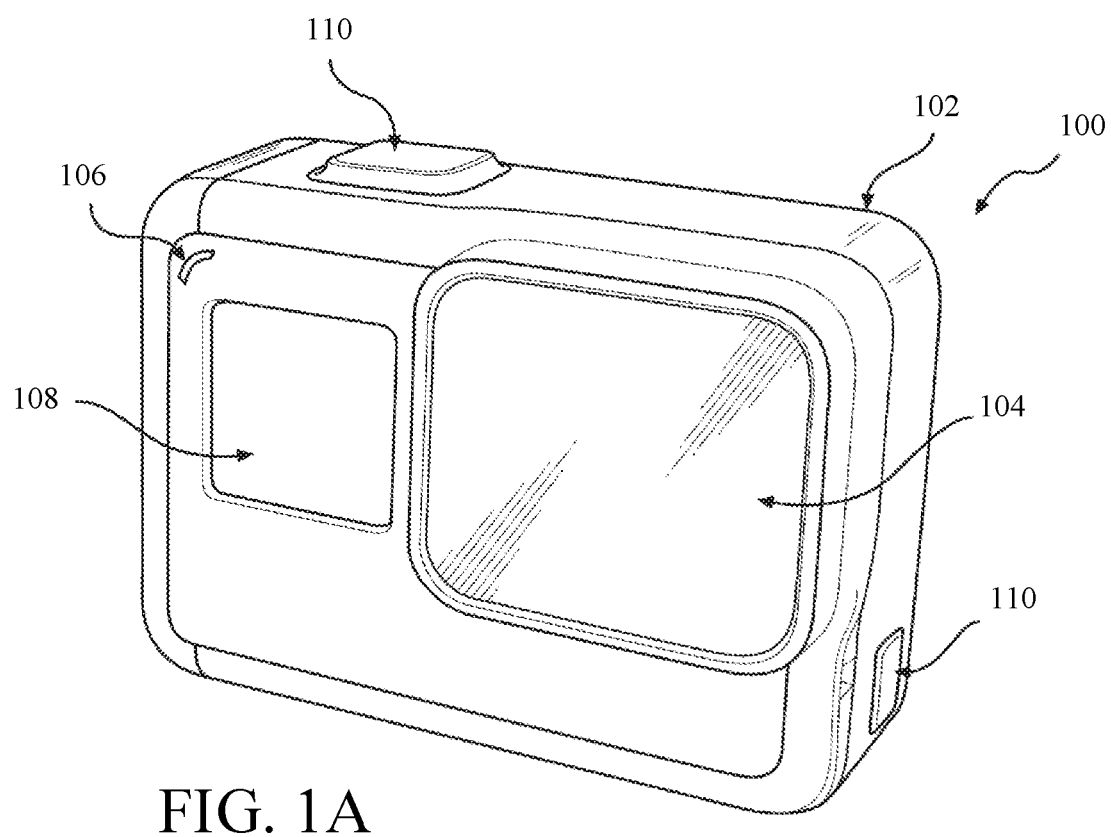
FIGS. 1A-D are isometric views of an example of an image capture device.

Integrated sensor lens assemblies (ISLAs) are typically sealed. When there is a change in temperature during subsequent camera assembly processes, or during camera operation, pressure builds up in a cavity inside the ISLA, which can cause the seal lens element (e.g., L1—the first optical element) to move outwards and change the optical properties of the ISLA resulting in an image quality impairment. Replacing the usual vent hole seal glue with a breathable membrane, allows the pressure to be equalized inside and outside the ISLA as the temperature varies, eliminating or mitigating the displacing force on the sealed lens element.

In integrated sensor lens assemblies that have a seal around the first element (e.g., where there is a water or dust seal) and a seal around the lens mount, a vent hole may be used to allow free passage of air during manufacturing (e.g., during glue cures).

At the end of the assembly process, this vent hole is typically sealed with a glue to block particles entering the ISLA which could end up in the optical path. Once sealed, changes in temperature during subsequent camera assembly processes, or during ISLA operation, result in an increase in pressure inside the lens assembly. This pressure imparts a force on the sealed lens element, which may cause the sealed lens element to be displaced along the optical axis. This results in a change in lens performance (e.g., change in a modulation transfer function (MTF) of the ISLA) and a shift in the focal plane away from the plane defined during the ISLA manufacturing.

The vent glue may be replaced with an air-breathable membrane. For example, a membrane that covers the vent hole may have pores large enough to permit nitrogen gas to flow through the membrane and the vent hole. This allows air pressure to equalize with the ambient (e.g., outside) pressure, while blocking particle ingress. A water-resistant membrane may also impede the ingress moisture into the ISLA, which under some conditions could lead to condensation occurring on optical surfaces. For example, the membrane may be made of polytetrafluoroethylene (e.g., teflon) or ceramic. Use of a breathable membrane covering a vent hole of an ISLA may prevent optical element displacement in the presence of temperature variations, while also preventing the ingress of relatively large particles, such as dust and/or water, which may improve the quality of images captured using the ISLA.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
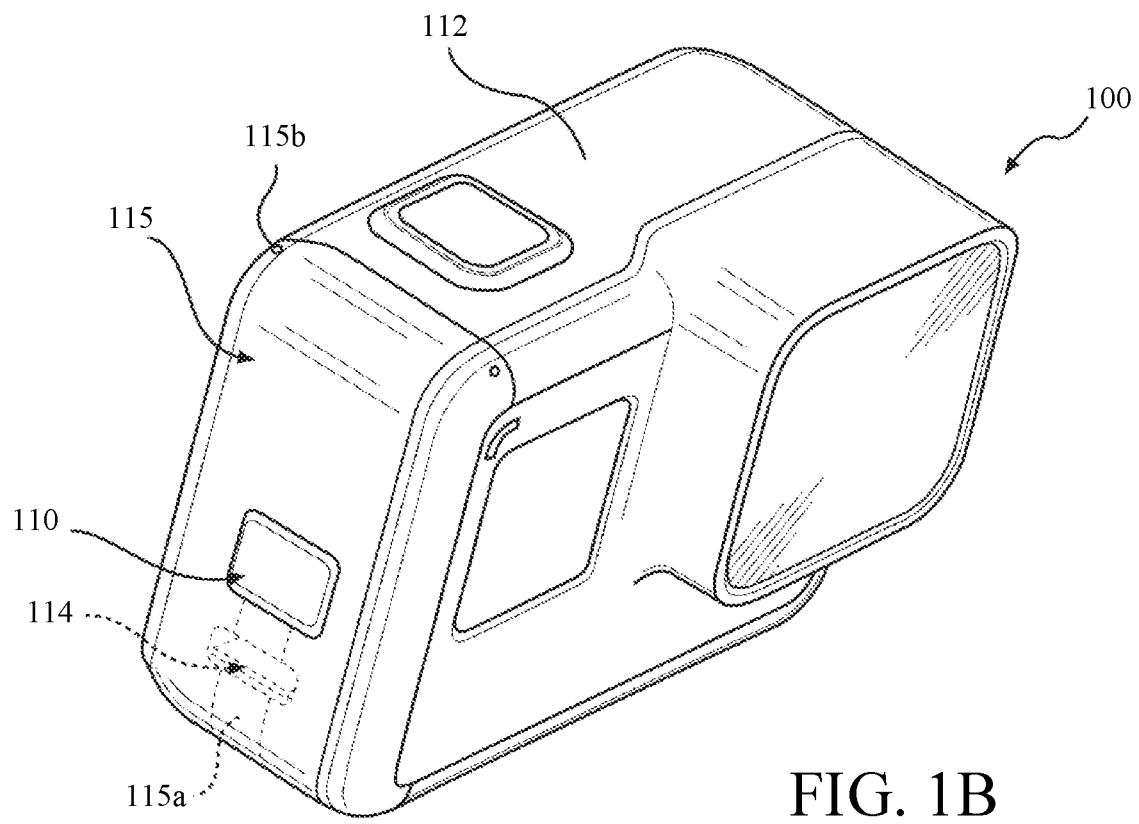
Figure 1C:
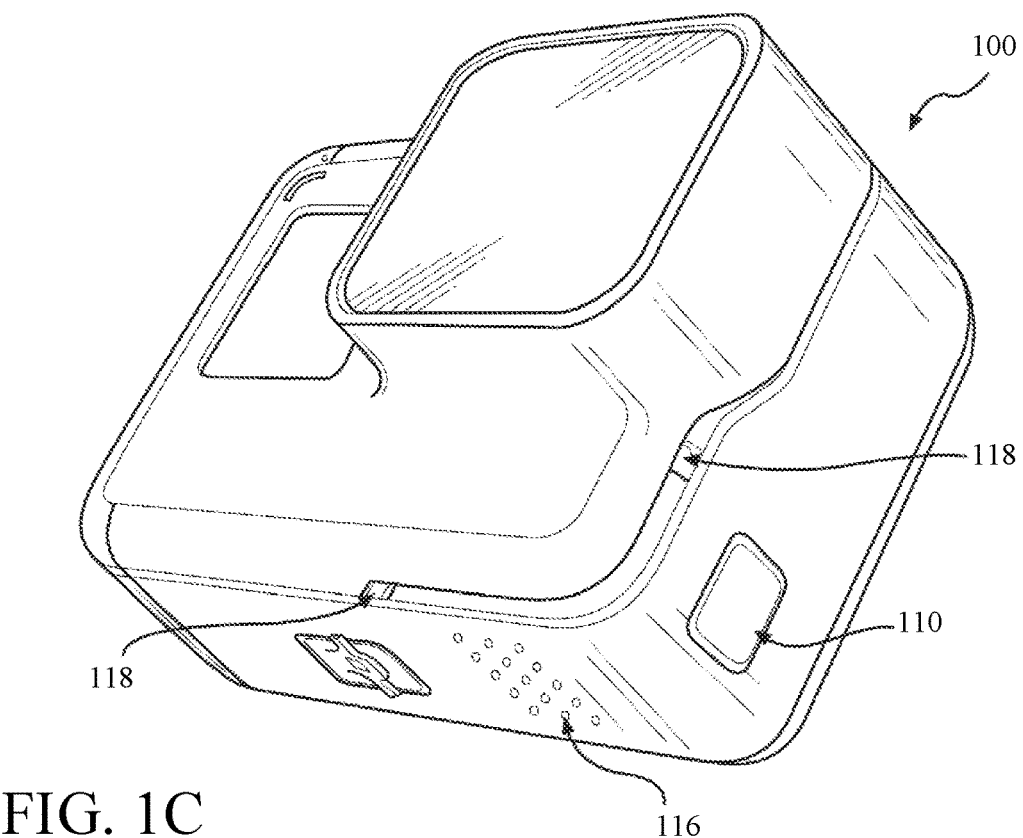
Figure 1D:
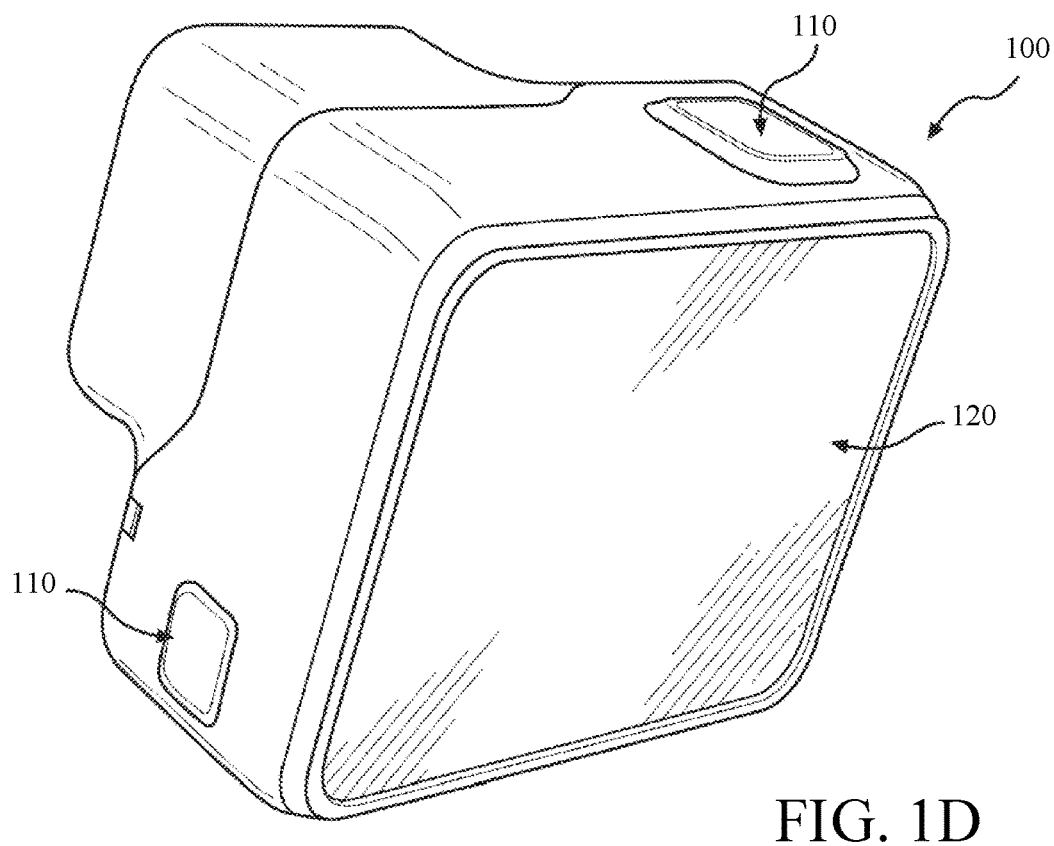

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
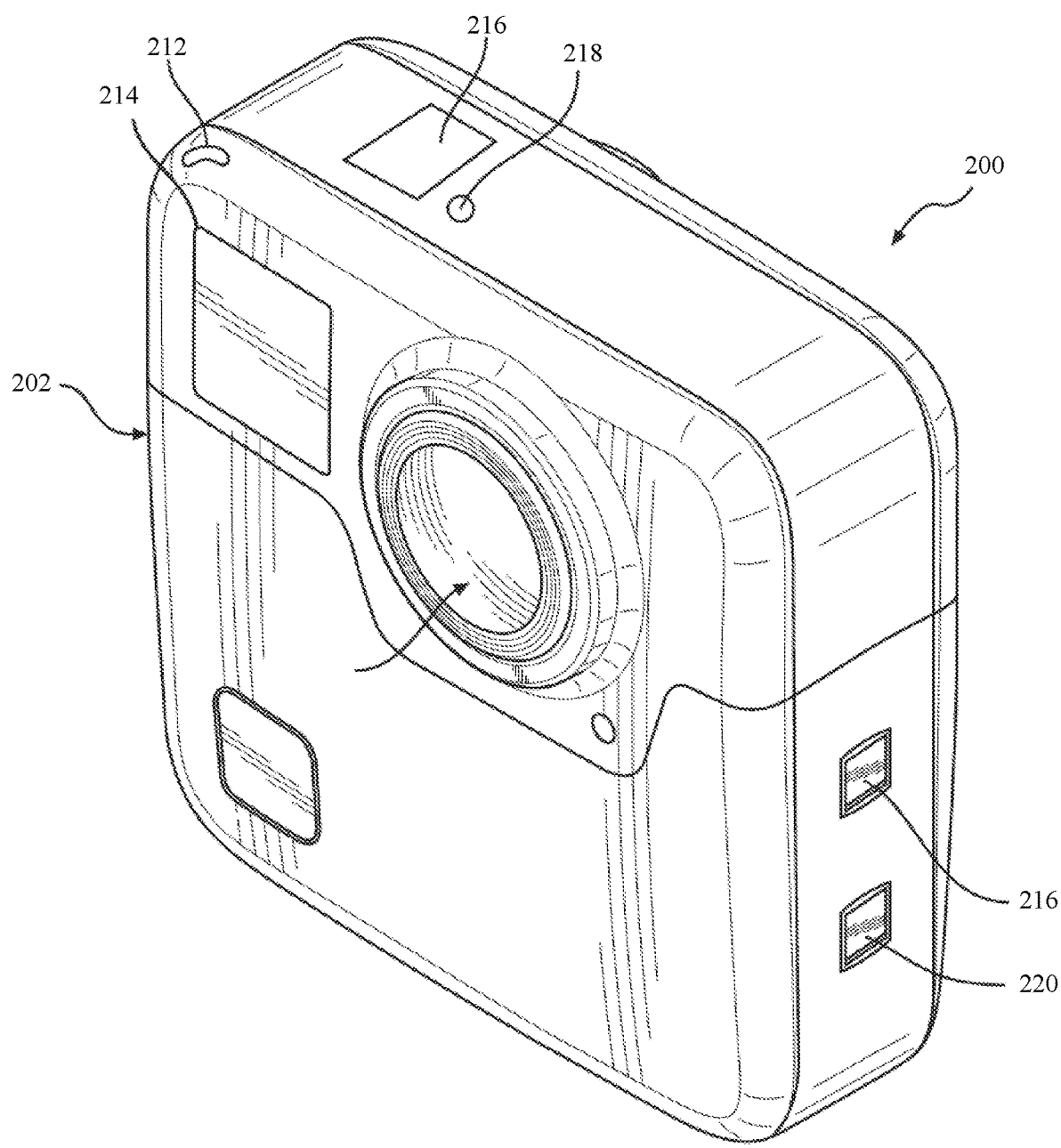
FIGS. 2A-B are isometric views of another example of an image capture device.
Figure 2B:
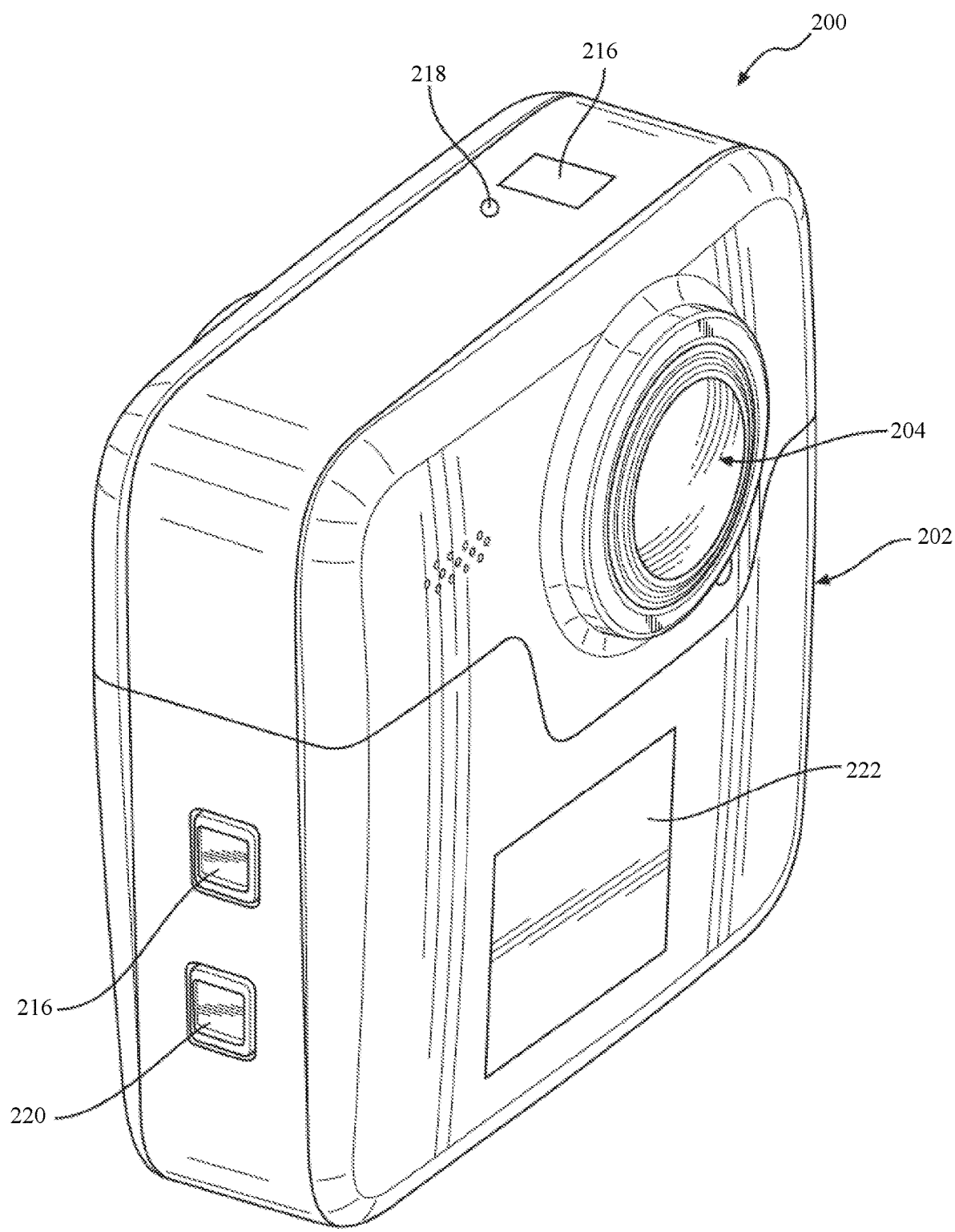

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
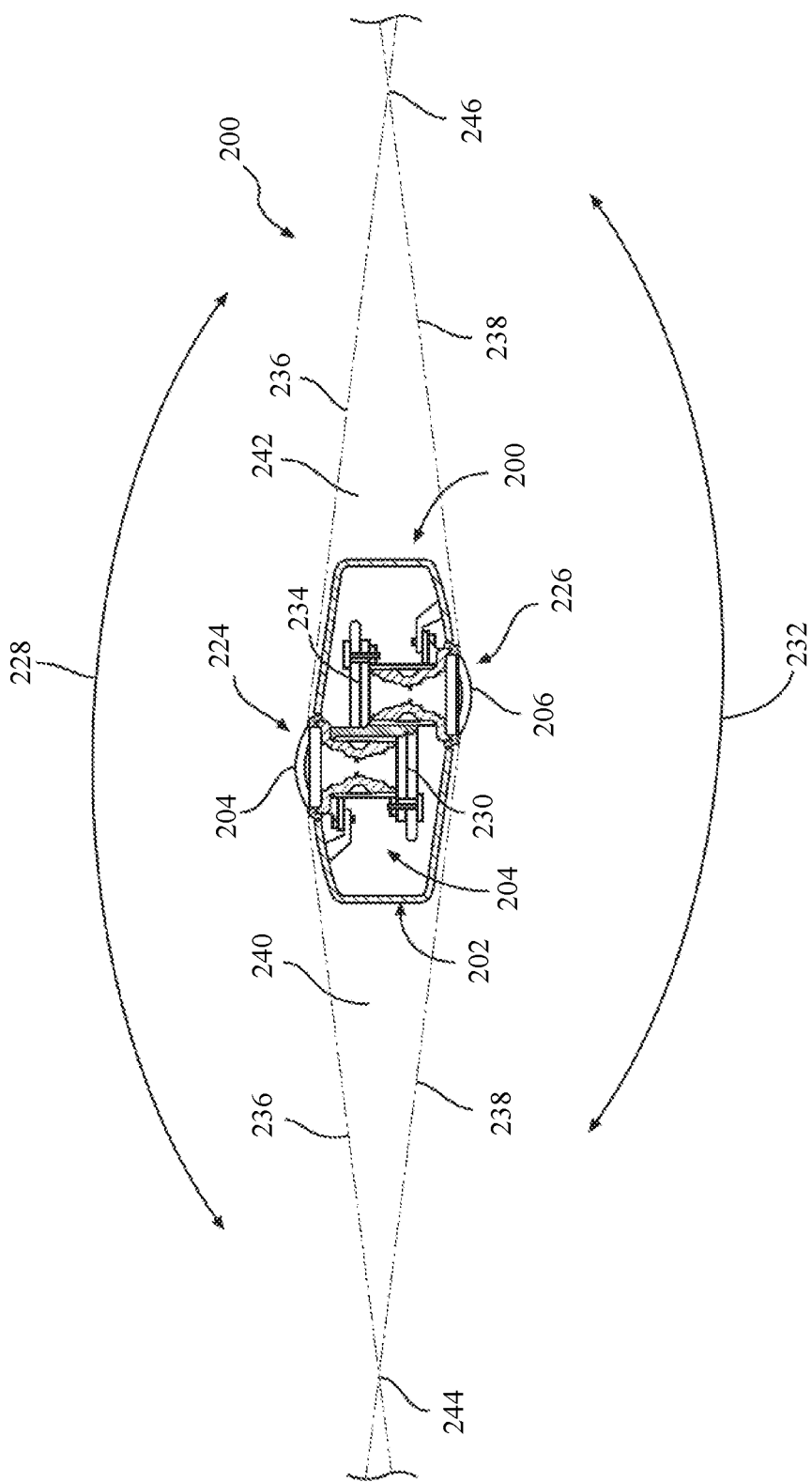
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first integrated sensor lens assembly 224 and a second integrated sensor lens assembly 226. The first integrated sensor lens assembly 224 defines a first field-of-view 228 as shown in FIG. 2C and includes the lens 204 that receives and directs light onto a first image sensor 230.

Similarly, the second integrated sensor lens assembly 226 defines a second field-of-view 232 as shown in FIG. 2C and includes the lens 206 that receives and directs light onto a second image sensor 234. To facilitate the capture of spherical images, the integrated sensor lens assemblies 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the integrated sensor lens assemblies 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the integrated sensor lens assemblies 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the integrated sensor lens assemblies 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figures 3A, 3B:
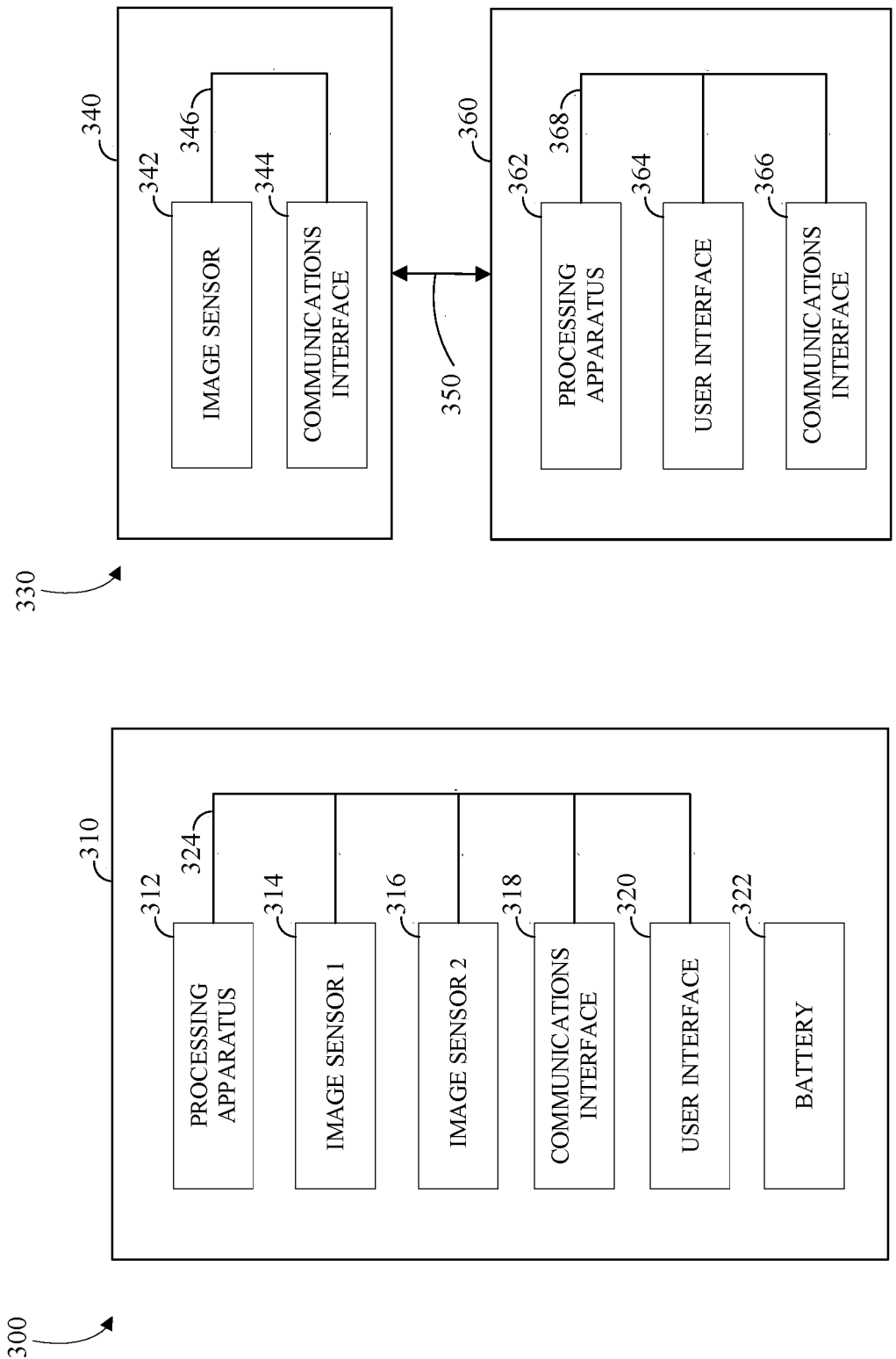
FIGS. 3A-B are block diagrams of examples of image capture systems.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

Figure 4:
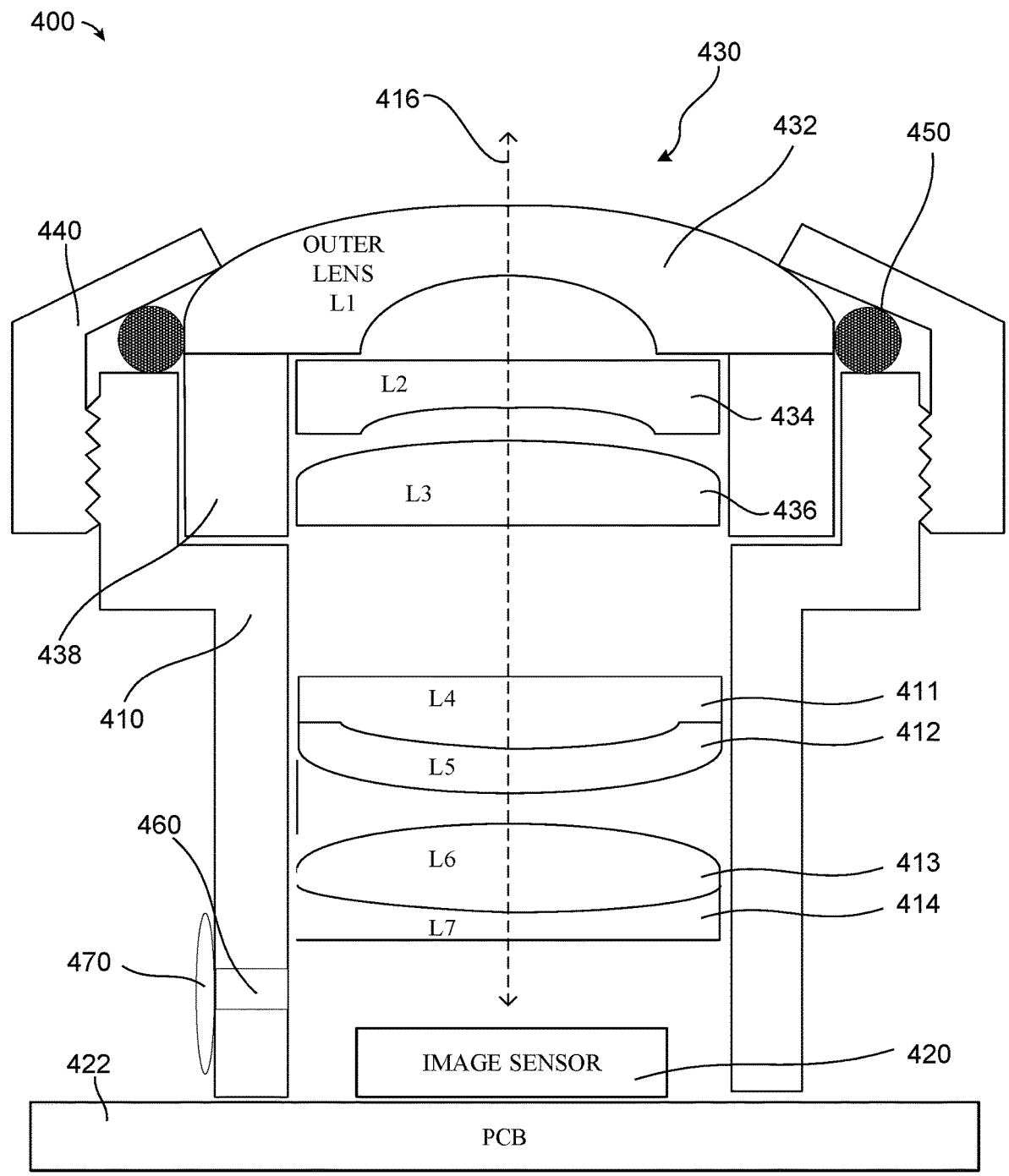
FIG. 4 illustrates a cross-sectional side view of an example of an image sensor lens assembly configured for image capture which includes a vent hole in a lens barrel that is covered by a membrane.

FIG. 4 illustrates a cross-sectional side view of an example of an integrated sensor lens assembly 400 configured for image capture, which includes a vent hole 460 in a lens barrel 410 that is covered by a membrane 470. The integrated sensor lens assembly 400 includes a lens barrel 410 including multiple inner lenses 411, 412, 413, and 414; an image sensor 420 on a circuit board 422; a replaceable lens structure 430 including an outer lens 432 and two additional lenses (an L2 lens 434 and an L3 lens 436), a replaceable barrel 438; a retaining ring 440; and an O-ring 450 for waterproofing. For example, the integrated sensor lens assembly 400 may be implemented as part of an image capture device, such as the image capture device 100 of FIGS. 1A-D or the image capture device 200 of FIGS. 2A-C (e.g., as integrated sensor lens assembly 224 and/or as integrated sensor lens assembly 226).

The integrated sensor lens assembly 400 includes a lens barrel 410 in a body of an image capture device. The lens barrel 410 may be an integrated part of a body of an image capture device. The lens barrel 410 includes multiple inner lenses 411, 412, 413, and 414. In some implementations, at least one of the multiple inner lenses 411, 412, 413, and 414 is curved. In the depicted example, the lens barrel 410 includes a curved inner lens 412. The curved inner lens 412 may refract light propagating through the lens barrel 410 to focus the light for capture by the image sensor 420. The lens barrel 410 includes a second curved inner lens 414. For example, the inner lenses 411, 412, 413, and 414 may be attached (e.g., using glue and/or ledges and flanges (not shown)) to inner walls of the lens barrel 410. The inner lenses 411, 412, 413, and 414 may be attached (e.g., with dabs of glue leaving gaps) to the lens barrel 410 in way that allows air to flow around the inner lenses 411, 412, 413, and 414 through the inner channel of the lens barrel 410, such the air pressure within the inner channel is approximately uniform. The inner lenses 411, 412, 413, and 414 may be oriented to direct light from a first end of the lens barrel 410, roughly parallel to an optical axis 416 of the lens barrel 410 to a second end of the lens barrel 410, where the light may be detected by the image sensor 420 to capture an image.

The integrated sensor lens assembly 400 includes a replaceable lens structure 430 that is mountable on a body of the image capture device (e.g., the image capture device 100 or the image capture device 200). For example, the replaceable lens structure 430 may include a first set of two or more stacked lenses (432, 434, and 436), including a first outer lens 432. For example, the replaceable lens structure 430 may include a first retaining ring 440 configured to fasten the first set of two or more stacked lenses (432, 434, and 436) against a first end of the lens barrel 410 in a first arrangement and configured to disconnect the first set of two or more stacked lenses (432, 434, and 436) from the body of the image capture device in a second arrangement. In some implementations, the first set of two or more stacked lenses (432, 434, and 436) is configured to collimate light incident on the first outer lens 432 at an interface between the lens barrel 410 and the replaceable lens structure 430. By collimating the light at the interface between the lens barrel 410 and the replaceable lens structure 430 (e.g., between the L3 lens 436 and the L4 lens 411 in the depicted example of FIG. 4), the integrated sensor lens assembly 400 for image capture may be less sensitive to misalignment of the first set of two or more stacked lenses (432, 434, and 436) in relation to the lens barrel 410.

The first outer lens 432 may be configured (e.g., shaped and/or positioned) to facilitate capture of images with a desired field-of-view (e.g., a 90 degree field-of-view, a 135 degree field-of-view, or a 180 degree field-of-view). For example, the first outer lens 432 may be a curved lens. For example, the first outer lens 432 may be a fisheye lens. For example, the first outer lens 432 may have a focal length of magnitude less than one meter. In some implementations, the first outer lens is aspherical. For example, an outer surface of the first outer lens 432 may have multiple radii of curvature. In some implementations (not shown in FIG. 4), the first outer lens 432 is hyper-hemispherical.

The replaceable lens structure 430 includes a replaceable barrel 438, which may serve to hold the one or more additional lenses (the L2 lens 434 and the L3 lens 436 in this example) in a fixed position and/or orientation with respect to the first outer lens 432. For example, the lenses 432, 434, and 436 may be attached (e.g., using glue and/or ledges and flanges (not shown)) to walls of the replaceable barrel 438. The additional lenses 434 and 436 may be attached (e.g., with dabs of glue leaving gaps) to the lens barrel 410 in way that allows air to flow around the additional lenses 434 and 436 through the inner channel of the replaceable barrel 438, such the air pressure within the inner channel is approximately uniform.

For example, the first outer lens 432 may be made of S-LAH58. For example, the L2 lens 434 may be made of S-LAH87. For example, the L2 lens 434 may be made of S-LAL13. For example, the L3 lens 436 may be made of S-NPH.

The first retaining ring 440 may include a fastening mechanism configured to facilitate transition between the first arrangement and the second arrangement by removably fastening the first retaining ring 440 to the lens barrel 410 or another nearby portion of the body of the image capture device. In the example depicted in FIG. 4, a threaded mechanism is employed to fasten the first retaining ring 440 to the lens barrel 410 and fasten the first set of two or more stacked lenses (432, 434, and 436) in a position covering a first end of the lens barrel 410. In some implementations (not shown in FIG. 4), a retaining ring 440 may employ other fastening mechanisms to secure a retaining ring to a body of an image capture device. For example, a retaining ring may include a bayonet mechanism configured to facilitate transition between the first arrangement and the second arrangement. For example, a retaining ring may include a threaded mechanism configured to facilitate transition between the first arrangement and the second arrangement. For example, a retaining ring may include a snap-ring mechanism configured to facilitate transition between the first arrangement and the second arrangement. For example, a retaining ring may include screw holes that enable screws to fasten the retaining ring to the body in the first arrangement.

In some implementations, the first retaining ring 440 is glued to the first outer lens 432. In some implementations, the first set of two or more stacked lenses (432, 434, and 436) is secured in the first retaining ring 440 as a captured mount, such that the first set of two or more stacked lenses (432, 434, and 436) may be rotated within the first retaining ring 440. For example, the first set of two or more stacked lenses (432, 434, and 436) and the first retaining ring 440 may be interlocked (e.g., using a flange and slot interface around a circumference of the first outer lens 432) and travel together but the first set of two or more stacked lenses (432, 434, and 436) may still be loose enough to turn inside the first retaining ring 440 independently. In some implementations, the first set of two or more stacked lenses (432, 434, and 436) is firmly held in a fixed orientation in the first arrangement by a friction lock formed by pressing the first retaining ring 440 against the first outer lens 432 in its position covering the first end of the lens barrel 410.

The integrated sensor lens assembly 400 includes an image sensor 420 (e.g., the image sensor 314 or the image sensor 342) mounted within a body of an image capture device at a second end of the lens barrel 410. The image sensor 420 may be configured to capture images based on light incident on the image sensor through the first set of two or more stacked lenses (432, 434, and 436) when the first retaining ring 440 is in the first arrangement. The image sensor 420 may be configured to capture images based on light incident on the image sensor through the first outer lens 432 and a curved inner lens 412 when the first retaining ring 440 is in the first arrangement. The image sensor 420 may be configured to detect light of a certain spectrum (e.g., the visible spectrum or the infrared spectrum) and convey information constituting an image as electrical signals (e.g., analog or digital signals). For example, the image sensor 420 may include charge-coupled devices (CCDs) or active pixel sensors in complementary metal-oxide-semiconductor (CMOS). In some implementations, the image sensor 420 includes a digital-to-analog converter. For example, the image sensor 420 may be configured to capture image data using a plurality of selectable exposure times.

The integrated sensor lens assembly 400 includes a waterproofing O-ring 450 that is positioned radially around the first outer lens 432. The O-ring may be composed of a rubbery material. For example, the O-ring 450 may be positioned to be compressed between the first retaining ring 440, the first outer lens 432 and the body (e.g., the lens barrel 410) of the image capture device to form a waterproofing seal. In some implementations, the O-ring 450 may be glued to the first retaining ring 440 and/or to the first outer lens 432. In some implementations (not shown in FIG. 4), a waterproofing O-ring that may be positioned inside the first outer lens 432, between the replaceable barrel 438 and the lens barrel 410. For example, the O-ring may be positioned and compressed along the direction of the optical axis 416 (e.g., vertically) between the replaceable barrel 438 and the lens barrel 410. In some implementations (not shown in FIG. 4), waterproofing may be provided by a ring of heat set glue. For example, these various water proofing mechanisms may result in the outer lens 432 being attached to the lens barrel 410 with an air-tight seal.

In some implementations (not shown in FIG. 4), the replaceable lens structure 430 may include one or more lenses, including at least an outer lens (e.g., the first outer lens 432), but not necessarily additional lenses (such as the L2 lens 434 or the L3 lens 436). For example, the replaceable barrel 438 may be omitted. For example, a replaceable lens structure 430 may be mountable on the body of the image capture device, the replaceable lens structure 430 including a first outer lens 432, and a first retaining ring 440 configured to fasten the first outer lens 432 against a first end of the lens barrel in a first arrangement and configured to disconnect the first outer lens 432 from the body of the image capture device in a second arrangement, wherein the first outer lens is a hyper-hemispherical lens with a focal length of magnitude less than one meter.

The integrated sensor lens assembly 400 of FIG. 4 may be employed for multiple image sensors of an image capture device (e.g., the image capture device 100 of FIGS. 1A-D or the image capture device 200 of FIGS. 2A-C) to facilitate capture of images with overlapping fields of view that may be stitched together to obtain stitched images with a wider composite field-of-view (e.g., panoramic images). For example, an image capture device, in which the lens barrel 410 is a first lens barrel and the image sensor 420 is a first image sensor, may include a second lens barrel in the body of the image capture device, a second replaceable lens structure mountable on the body of the image capture device, and a second image sensor mounted within the body. For example, the second replaceable lens structure may include a second outer lens, and a second retaining ring configured to fasten the second outer lens against a first end of the second lens barrel in a third arrangement and configured to disconnect the second outer lens from the body of the image capture device in a fourth arrangement. In some implementations, the second outer lens is a hyper-hemispherical lens with a focal length of magnitude less than one meter. For example, the second image sensor may be mounted within the body at a second end of the second lens barrel, and configured to capture images based on light incident on the second image sensor through the second outer lens when the second retaining ring is in the third arrangement. In some implementations, the first image sensor and the second image sensor face in opposite directions (e.g., as shown for the first image sensor 230 and the second image sensor 234).

The integrated sensor lens assembly 400 includes a lens barrel 410 having an inner channel extending from a first end of the lens barrel to a second end of the lens barrel, the lens barrel including one or more inner lenses (411, 412, 413, and 414) positioned within the inner channel. The lens barrel 410 has a vent hole 460 in a side of the lens barrel 410 that extends from the inner channel to an exterior surface of the lens barrel. The lens assembly 400 includes a cavity between an outer lens 432 and an image sensor 420 attached to a circuit board 422, with one or more inner lenses (411, 412, 413, 414, 434, and 436) positioned inside the cavity to direct light incident on the outer lens 432 to the image sensor 420. The cavity is connected to a space external to the lens assembly by the vent hole 460. The vent hole 460 may provide a path for air to flow into or out of the cavity of the integrated sensor lens assembly 400 that includes the inner channel of the lens barrel 410 and the inner channel of the replaceable barrel 438. In some implementations, the space external to the lens assembly 400 is internal to a body (e.g., the body 102 or the body 202) of an image capture device (e.g., the image capture device 100 or the image capture device 200) that is attached to the lens assembly 400. In some implementations, the space external to the lens assembly 400 is external to a body (e.g., the body 102 or the body 202) of the image capture device that is attached to the lens assembly 400.

The integrated sensor lens assembly 400 includes a membrane 470 attached to the lens barrel 410 and positioned to cover the vent hole 460. The membrane 470 has pores large enough to permit nitrogen gas to flow through the membrane 470 and the vent hole 460. For example, the membrane may include pores of widths in a range between 5 micrometers and 60 micrometers, which may permit the flow of air while preventing or reducing the ingress of dust and/or water into the cavity of the lens assembly 400. For example, the membrane 470 may be hydrophobic. For example, the membrane 470 may be waterproof. For example, the membrane 470 may be made of or include polytetrafluoroethylene. For example, the membrane 470 may be made of or include ceramic. In some implementations, the membrane is glued to an exterior surface of the lens barrel in a position covering the vent hole 460 to control the ingress and egress of particles through the vent hole 460. In some implementations (not shown in FIG. 4), the membrane is inserted into the vent hole 460 to position the membrane 470 to cover the vent hole 460 to control the ingress and egress of particles through the vent hole 460.

The outer lens 432 may be attached to the lens barrel 410 and positioned to cover the first end of the lens barrel 410. In this example, the outer lens 432 is attached to the lens barrel 410 and positioned to cover the first end of the lens barrel 410 using the retaining ring 440. The outer lens 432 may be attached to the lens barrel 410 with an air-tight seal (e.g., formed using the O-ring 450 or a glue ring).

The integrated sensor lens assembly 400 includes a circuit board 422 positioned to cover the second end of the lens barrel 410. For example, the circuit board 422 may be a printed circuit board (PCB) (e.g., made of FR4 material). In some implementations, the lens barrel 410 is glued to the circuit board 422. The integrated sensor lens assembly 400 includes the image sensor 420 attached to the circuit board 422 and positioned at the second end of the lens barrel 410 to receive light incident through the one or more inner lenses (411, 412, 413, and 414) of the lens barrel 410.

Figure 5:
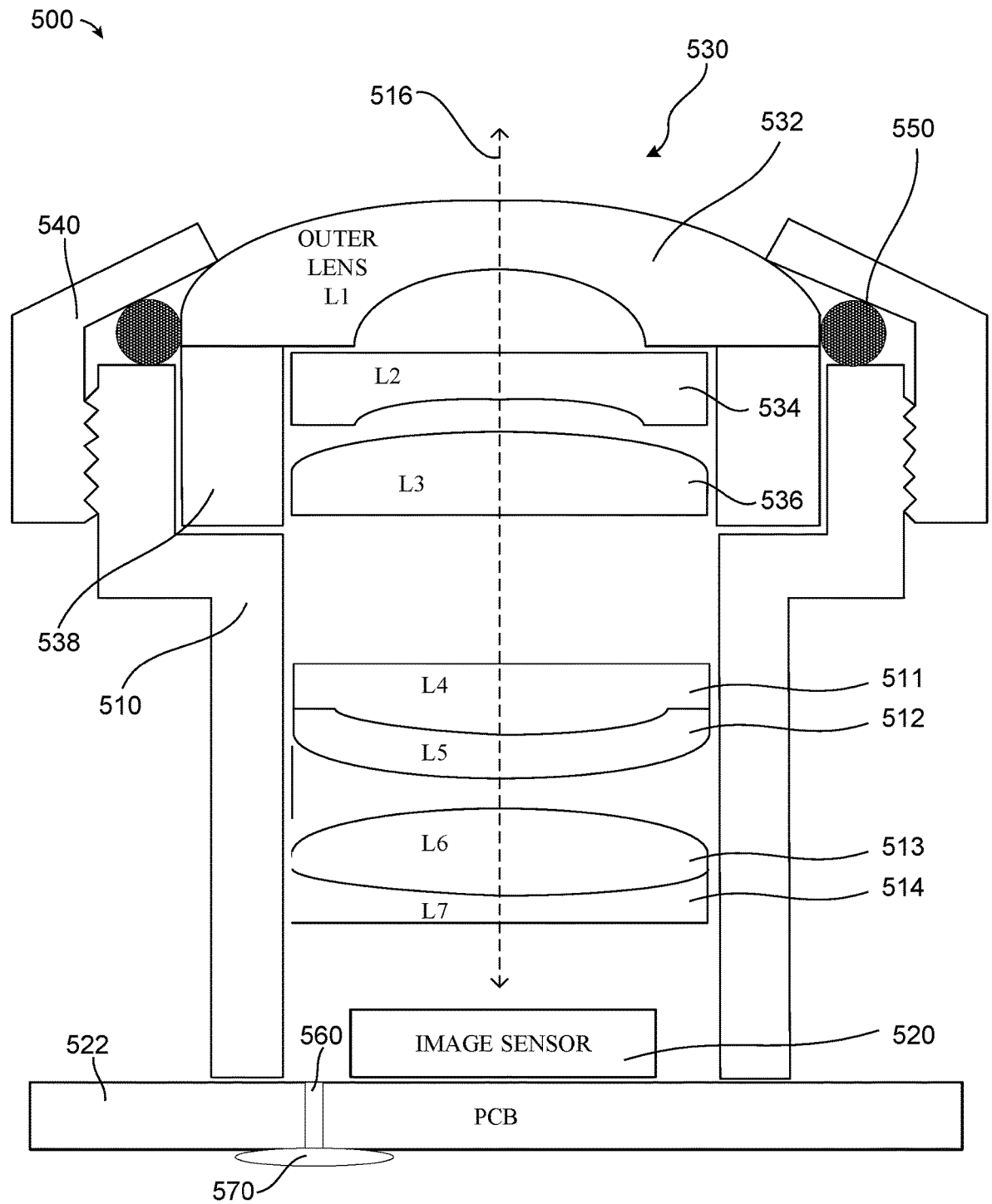
FIG. 5 illustrates a cross-sectional side view of an example of an image sensor lens assembly configured for image capture which includes a vent hole in a circuit board that is covered by a membrane.

FIG. 5 illustrates a cross-sectional side view of an example of an integrated sensor lens assembly 500 configured for image capture, which includes a vent hole 560 in a circuit board 522 that is covered by a membrane 570. The integrated sensor lens assembly 500 includes a lens barrel 510 including multiple inner lenses 511, 512, 513, and 514; an image sensor 520 on a circuit board 522; a replaceable lens structure 530 including an outer lens 532 and two additional lenses (an L2 lens 534 and an L3 lens 536), a replaceable barrel 538, and a retaining ring 540; and an O-ring 550 for waterproofing. For example, the integrated sensor lens assembly 500 may be implemented as part of an image capture device, such as the image capture device 100 of FIGS. 1A-D or the image capture device 200 of FIGS. 2A-C (e.g., as integrated sensor lens assembly 224 and/or as integrated sensor lens assembly 226).

The integrated sensor lens assembly 500 includes a lens barrel 510 in a body of an image capture device. The lens barrel 510 may be an integrated part of a body of an image capture device. The lens barrel 510 includes multiple inner lenses 511, 512, 513, and 514. In some implementations, at least one of the multiple inner lenses 511, 512, 513, and 514 is curved. In the depicted example, the lens barrel 510 includes a curved inner lens 512. The curved inner lens 512 may refract light propagating through the lens barrel 510 to focus the light for capture by the image sensor 520. The lens barrel 510 includes a second curved inner lens 514. For example, the inner lenses 511, 512, 513, and 514 may be attached (e.g., using glue and/or ledges and flanges (not shown)) to inner walls of the lens barrel 510. The inner lenses 511, 512, 513, and 514 may be attached (e.g., with dabs of glue leaving gaps) to the lens barrel 510 in way that allows air to flow around the inner lenses 511, 512, 513, and 514 through the inner channel of the lens barrel 510, such the air pressure within the inner channel is approximately uniform. The inner lenses 511, 512, 513, and 514 may be oriented to direct light from a first end of the lens barrel 510, roughly parallel to an optical axis 516 of the lens barrel 510 to a second end of the lens barrel 510, where the light may be detected by the image sensor 520 to capture an image.

The integrated sensor lens assembly 500 includes a replaceable lens structure 530 that is mountable on a body of the image capture device (e.g., the image capture device 100 or the image capture device 200). For example, the replaceable lens structure 530 may include a first set of two or more stacked lenses (532, 534, and 536), including a first outer lens 532. For example, the replaceable lens structure 530 may include a first retaining ring 540 configured to fasten the first set of two or more stacked lenses (532, 534, and 536) against a first end of the lens barrel 510 in a first arrangement and configured to disconnect the first set of two or more stacked lenses (532, 534, and 536) from the body of the image capture device in a second arrangement. In some implementations, the first set of two or more stacked lenses (532, 534, and 536) is configured to collimate light incident on the first outer lens 532 at an interface between the lens barrel 510 and the replaceable lens structure 530. By collimating the light at the interface between the lens barrel 510 and the replaceable lens structure 530 (e.g., between the L3 lens 536 and the L4 lens 511 in the depicted example of FIG. 5), the integrated sensor lens assembly 500 for image capture may be less sensitive to misalignment of the first set of two or more stacked lenses (532, 534, and 536) in relation to the lens barrel 510.

The first outer lens 532 may be configured (e.g., shaped and/or positioned) to facilitate capture of images with a desired field-of-view (e.g., a 90 degree field-of-view, a 135 degree field-of-view, or a 180 degree field-of-view). For example, the first outer lens 532 may be a curved lens. For example, the first outer lens 532 may be a fisheye lens. For example, the first outer lens 532 may have a focal length of magnitude less than one meter. In some implementations, the first outer lens is aspherical. For example, an outer surface of the first outer lens 532 may have multiple radii of curvature. In some implementations (not shown in FIG. 5), the first outer lens 532 is hyper-hemispherical.

The replaceable lens structure 530 includes a replaceable barrel 538, which may serve to hold the one or more additional lenses (the L2 lens 534 and the L3 lens 536 in this example) in a fixed position and/or orientation with respect to the first outer lens 532. For example, the lenses 532, 534, and 536 may be attached (e.g., using glue and/or ledges and flanges (not shown)) to walls of the replaceable barrel 538. The additional lenses 534 and 536 may be attached (e.g., with dabs of glue leaving gaps) to the lens barrel 510 in way that allows air to flow around the additional lenses 534 and 536 through the inner channel of the replaceable barrel 538, such the air pressure within the inner channel is approximately uniform.

For example, the first outer lens 532 may be made of S-LAH58. For example, the L2 lens 534 may be made of S-LAH87. For example, the L2 lens 534 may be made of S-LAL13. For example, the L3 lens 536 may be made of S-NPH.

The first retaining ring 540 may include a fastening mechanism configured to facilitate transition between the first arrangement and the second arrangement by removably fastening the first retaining ring 540 to the lens barrel 510 or another nearby portion of the body of the image capture device. In the example depicted in FIG. 5, a threaded mechanism is employed to fasten the first retaining ring 540 to the lens barrel 510 and fasten the first set of two or more stacked lenses (532, 534, and 536) in a position covering a first end of the lens barrel 510. In some implementations (not shown in FIG. 5), a retaining ring 540 may employ other fastening mechanisms to secure a retaining ring to a body of an image capture device. For example, a retaining ring may include a bayonet mechanism configured to facilitate transition between the first arrangement and the second arrangement. For example, a retaining ring may include a threaded mechanism configured to facilitate transition between the first arrangement and the second arrangement. For example, a retaining ring may include a snap-ring mechanism configured to facilitate transition between the first arrangement and the second arrangement. For example, a retaining ring may include screw holes that enable screws to fasten the retaining ring to the body in the first arrangement.

In some implementations, the first retaining ring 540 is glued to the first outer lens 532. In some implementations, the first set of two or more stacked lenses (532, 534, and 536) is secured in the first retaining ring 540 as a captured mount, such that the first set of two or more stacked lenses (532, 534, and 536) may be rotated within the first retaining ring 540. For example, the first set of two or more stacked lenses (532, 534, and 536) and the first retaining ring 540 may be interlocked (e.g., using a flange and slot interface around a circumference of the first outer lens 532) and travel together but the first set of two or more stacked lenses (532, 534, and 536) may still be loose enough to turn inside the first retaining ring 540 independently. In some implementations, the first set of two or more stacked lenses (532, 534, and 536) is firmly held in a fixed orientation in the first arrangement by a friction lock formed by pressing the first retaining ring 540 against the first outer lens 532 in its position covering the first end of the lens barrel 510.

The integrated sensor lens assembly 500 includes an image sensor 520 (e.g., the image sensor 314 or the image sensor 342) mounted within a body of an image capture device at a second end of the lens barrel 510. The image sensor 520 may be configured to capture images based on light incident on the image sensor through the first set of two or more stacked lenses (532, 534, and 536) when the first retaining ring 540 is in the first arrangement. The image sensor 520 may be configured to capture images based on light incident on the image sensor through the first outer lens 532 and a curved inner lens 512 when the first retaining ring 540 is in the first arrangement. The image sensor 520 may be configured to detect light of a certain spectrum (e.g., the visible spectrum or the infrared spectrum) and convey information constituting an image as electrical signals (e.g., analog or digital signals). For example, the image sensor 520 may include charge-coupled devices (CCDs) or active pixel sensors in complementary metal-oxide-semiconductor (CMOS). In some implementations, the image sensor 520 includes a digital-to-analog converter. For example, the image sensor 520 may be configured to capture image data using a plurality of selectable exposure times.

The integrated sensor lens assembly 500 includes a waterproofing O-ring 550 that is positioned radially around the first outer lens 532. The O-ring may be composed of a rubbery material. For example, the O-ring 550 may be positioned to be compressed between the first retaining ring 540, the first outer lens 532 and the body (e.g., the lens barrel 510) of the image capture device to form a waterproofing seal. In some implementations, the O-ring 550 may be glued to the first retaining ring 540 and/or to the first outer lens 532. In some implementations (not shown in FIG. 5), a waterproofing O-ring that may be positioned inside the first outer lens 532, between the replaceable barrel 538 and the lens barrel 510. For example, the O-ring may be positioned and compressed along the direction of the optical axis 516 (e.g., vertically) between the replaceable barrel 538 and the lens barrel 510. In some implementations (not shown in FIG. 5), waterproofing may be provided by a ring of heat set glue. For example, these various water proofing mechanisms may result in the outer lens 532 being attached to the lens barrel 510 with an air-tight seal.

In some implementations (not shown in FIG. 5), the replaceable lens structure 530 may include one or more lenses, including at least an outer lens (e.g., the first outer lens 532), but not necessarily additional lenses (such as the L2 lens 534 or the L3 lens 536). For example, the replaceable barrel 538 may be omitted. For example, a replaceable lens structure 530 may be mountable on the body of the image capture device, the replaceable lens structure 530 including a first outer lens 532, and a first retaining ring 540 configured to fasten the first outer lens 532 against a first end of the lens barrel in a first arrangement and configured to disconnect the first outer lens 532 from the body of the image capture device in a second arrangement, wherein the first outer lens is a hyper-hemispherical lens with a focal length of magnitude less than one meter.

The integrated sensor lens assembly 500 of FIG. 5 may be employed for multiple image sensors of an image capture device (e.g., the image capture device 100 of FIGS. 1A-D or the image capture device 200 of FIGS. 2A-C) to facilitate capture of images with overlapping fields of view that may be stitched together to obtain stitched images with a wider composite field-of-view (e.g., panoramic images). For example, an image capture device, in which the lens barrel 510 is a first lens barrel and the image sensor 520 is a first image sensor, may include a second lens barrel in the body of the image capture device, a second replaceable lens structure mountable on the body of the image capture device, and a second image sensor mounted within the body. For example, the second replaceable lens structure may include a second outer lens, and a second retaining ring configured to fasten the second outer lens against a first end of the second lens barrel in a third arrangement and configured to disconnect the second outer lens from the body of the image capture device in a fourth arrangement. In some implementations, the second outer lens is a hyper-hemispherical lens with a focal length of magnitude less than one meter. For example, the second image sensor may be mounted within the body at a second end of the second lens barrel, and configured to capture images based on light incident on the second image sensor through the second outer lens when the second retaining ring is in the third arrangement. In some implementations, the first image sensor and the second image sensor face in opposite directions (e.g., as shown for the first image sensor 230 and the second image sensor 234).

The integrated sensor lens assembly 500 includes a lens barrel 510 having an inner channel extending from a first end of the lens barrel 510 to a second end of the lens barrel, the lens barrel including one or more inner lenses (511, 512, 513, and 514) positioned within the inner channel. The integrated sensor lens assembly 500 includes a circuit board 522 attached to the lens barrel 510 and having a side positioned to cover the second end of the lens barrel 510. The circuit board 522 has a vent hole 560 in the circuit board 522 that extends from the inner channel to an opposite side of the circuit board 522. For example, the circuit board 522 may be a printed circuit board (PCB) (e.g., made of FR4 material). In some implementations, the lens barrel 510 is glued to the circuit board 522. The lens assembly 500 includes a cavity between the outer lens 532 and the image sensor 520 attached to the circuit board 522, with one or more inner lenses (511, 512, 513, 514, 534, and 536) positioned inside the cavity to direct light incident on the outer lens 532 to the image sensor 520. The cavity is connected to a space external to the lens assembly by the vent hole 560. The vent hole 560 may provide a path for air to flow into or out of the cavity of the integrated sensor lens assembly 500 that includes the inner channel of the lens barrel 510 and the inner channel of the replaceable barrel 538. In some implementations, the space external to the lens assembly 500 is internal to a body (e.g., the body 102 or the body 202) of an image capture device (e.g., the image capture device 100 or the image capture device 200) that is attached to the lens assembly 500.

The integrated sensor lens assembly 500 includes a membrane 570 attached to the circuit board 522 and positioned to cover the vent hole 560. The membrane 570 has pores large enough to permit nitrogen gas to flow through the membrane 570 and the vent hole 560. For example, the membrane may include pores of widths in a range between 5 micrometers and 60 micrometers, which may permit the flow of air while preventing or reducing the ingress of dust and/or water into the cavity of the lens assembly 500. For example, the membrane 570 may be hydrophobic. For example, the membrane 570 may be waterproof. For example, the membrane 570 may be made of or include polytetrafluoroethylene. For example, the membrane 570 may be made of or include ceramic. In some implementations, the membrane is glued to the opposite side of the circuit board 522 in a position covering the vent hole 560 to control the ingress and egress of particles through the vent hole 560. In some implementations (not shown in FIG. 5), the membrane is inserted into the vent hole 560 to position the membrane 570 to cover the vent hole 560 to control the ingress and egress of particles through the vent hole 560.

The outer lens 532 may be attached to the lens barrel 510 and positioned to cover the first end of the lens barrel 510. In this example, the outer lens 532 is attached to the lens barrel 510 and positioned to cover the first end of the lens barrel 510 using the retaining ring 540. The outer lens 532 may be attached to the lens barrel 510 with an air-tight seal (e.g., formed using the O-ring 550 or a glue ring).

The integrated sensor lens assembly 500 includes the image sensor 520 attached to the circuit board 522 and positioned at the second end of the lens barrel 510 to receive light incident through the one or more inner lenses (511, 512, 513, and 514) of the lens barrel 510.

In some implementations (not shown in FIG. 5), the O-ring 550 may be replaced by an O-ring made of an air-breathable membrane material (e.g., polytetrafluoroethylene), which may enable air to flow into or out of the cavity of the lens assembly 500 while restricting the ingress of large dust particles and/or water. For example, the outer lens 532 may be attached to the first end of the lens barrel 510 with a seal made using an O-ring that has pores large enough to permit nitrogen gas to flow through the O-ring.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An apparatus comprising:
   a first lens barrel having an inner channel extending from a first end of the first lens barrel to a second end of the first lens barrel, the first end of the first lens barrel including exterior threading to facilitate connection of a retaining ring to the first lens barrel, the second end of the first lens barrel located inwardly of the exterior threading along a radius of the first lens barrel, the first lens barrel including one or more inner lenses positioned within the inner channel, wherein the first lens barrel has a vent hole in a side of the second end of the first lens barrel that extends from the inner channel to an exterior surface of the first lens barrel;
   a second lens barrel positioned within the first lens barrel and including an outer lens and an additional inner lens, the second lens barrel removable from the first lens barrel to facilitate replacement thereof; and
   a membrane attached to the second end of the first lens barrel such that the membrane is located externally of the second end of the first lens barrel and positioned to cover the vent hole, wherein the membrane has pores large enough to permit nitrogen gas to flow through the membrane and the vent hole.

2. The apparatus of claim 1, wherein the second end of the first lens barrel is covered by a circuit board and the membrane is located inwardly of the exterior threading on the first end of the first lens barrel along the radius of the first lens barrel.

3. The apparatus of claim 2, wherein the outer lens is attached to the first lens barrel with an air-tight seal.

4. The apparatus of claim 1, comprising:
   a circuit board positioned to cover the second end of the first lens barrel; and
   an image sensor attached to the circuit board and positioned at the second end of the first lens barrel to receive light incident through the one or more inner lenses of the first lens barrel.

5. The apparatus of claim 4, wherein the first lens barrel is glued to the circuit board.

6. The apparatus of claim 1, wherein the membrane is hydrophobic.

7. The apparatus of claim 1, wherein the membrane includes pores of widths in a range between 5 micrometers and 60 micrometers.

8. The apparatus of claim 1, wherein the second lens barrel defines an inner channel, the additional inner lens located within the inner channel.

9. The apparatus of claim 1, wherein the outer lens is secured to an external surface of the second lens barrel.

10. The apparatus of claim 1, wherein the retaining ring is in direct contact with the outer lens.

11. An apparatus comprising:
    a first lens barrel having an inner channel extending from a first end of the first lens barrel to a second end of the first lens barrel, the first lens barrel including one or more inner lenses positioned within the inner channel;
    a second lens barrel positioned within the first lens barrel and including an outer lens and an additional inner lens, the second lens barrel removable from the first lens barrel to facilitate replacement thereof;
    a circuit board attached to the second end of the first lens barrel and having a side positioned to cover the second end of the first lens barrel, wherein the inner channel is open to the circuit board and the circuit board has a single vent hole extending linearly through the circuit board such that the single vent hole defines a non-tortuous path that extends from the inner channel to an opposite side of the circuit board; and
    a membrane attached to the circuit board and positioned to cover the single vent hole, wherein the membrane has pores large enough to permit nitrogen gas to flow through the membrane and the single vent hole.

12. The apparatus of claim 11, comprising:
    an outer lens that is attached to the first lens barrel and positioned to cover the first end of the first lens barrel.

13. The apparatus of claim 12, wherein the outer lens is attached to the first lens barrel with an air-tight seal.

14. The apparatus of claim 11, comprising:
    an image sensor attached to the circuit board and positioned at the second end of the first lens barrel to receive light incident through the one or more inner lenses of the first lens barrel.

15. The apparatus of claim 11, wherein the first lens barrel is glued to the circuit board.

16. The apparatus of claim 11, wherein the membrane is hydrophobic.

17. The apparatus of claim 11, wherein the membrane includes polytetrafluoroethylene.

18. The apparatus of claim 11, wherein the membrane is waterproof.

19. An image capture device comprising:
a lens assembly including:
   a first lens barrel defining a cavity and including one or more inner lenses to direct light onto an image sensor attached to a circuit board and located at one end of the cavity, the cavity connected to a space external to the lens assembly by a vent hole extending linearly through the circuit board to define a non-tortuous path, the first lens barrel including exterior threading to facilitate connection of a retaining ring thereto; and
   a second lens barrel positioned within the first lens barrel and including an outer lens and an additional inner lens, the second lens barrel removable from the first lens barrel to facilitate replacement thereof; and
a membrane positioned to cover the vent hole, wherein the membrane has pores large enough to permit nitrogen gas to flow through the membrane and the vent hole.

20. The image capture device of claim 19, wherein the space external to the lens assembly is internal to a body of the image capture device that is attached to the lens assembly.

\* \* \* \* \*